US012373234B2

(12) United States Patent
Lerzer et al.

(10) Patent No.: US 12,373,234 B2
(45) Date of Patent: Jul. 29, 2025

(54) MOTOR VEHICLE COMPUTER SYSTEM WITH HYPERVISOR, AND MOTOR VEHICLE

(71) Applicant: AUDI AG, Ingolstadt (DE)

(72) Inventors: Jürgen Lerzer, Neumarkt (DE); Christoph Dalke, Kipfenberg (DE)

(73) Assignee: AUDI AG, Ingolstadt (DE)

( * ) Notice: Subject to any disclaimer, the term of this patent is extended or adjusted under 35 U.S.C. 154(b) by 504 days.

(21) Appl. No.: 17/621,536

(22) PCT Filed: Apr. 27, 2020

(86) PCT No.: PCT/EP2020/061587
§ 371 (c)(1),
(2) Date: Dec. 21, 2021

(87) PCT Pub. No.: WO2020/259897
PCT Pub. Date: Dec. 30, 2020

(65) Prior Publication Data
US 2022/0357970 A1      Nov. 10, 2022

(30) Foreign Application Priority Data
Jun. 24, 2019    (DE) .................... 10 2019 209 086.9

(51) Int. Cl.
*G06F 9/455*        (2018.01)
(52) U.S. Cl.
CPC .. *G06F 9/45558* (2013.01); *G06F 2009/4557* (2013.01)
(58) Field of Classification Search
CPC ......... G06F 9/45558; G06F 2009/4557; G06F 9/5077
See application file for complete search history.

(56) References Cited

U.S. PATENT DOCUMENTS 9,753,770 B2    9/2017  Gordon et al.
2012/0084777 A1    4/2012  Jayamohan
(Continued)

FOREIGN PATENT DOCUMENTS

CN    104715202 A    6/2015
CN    107807840 A    3/2018
(Continued)

OTHER PUBLICATIONS

International Search Report and Written Opinion of the International Searching Authority directed to related International Patent Application No. PCT/EP2020/061587, mailed Jul. 22, 2020, with attached English-language translation; 24 pages.
(Continued)

*Primary Examiner* — Sisley N Kim
(74) *Attorney, Agent, or Firm* — Sterne, Kessler, Goldstein & Fox P.L.L.C.

(57) ABSTRACT

The invention relates to a computer system for a motor vehicle, having a processor apparatus with a plurality of real processor cores in the form of circuits, a plurality of virtual machines, each of which in each case has at least one virtual processor core for executing software programs, a hypervisor apparatus that is designed to run the virtual machines simultaneously on the processor apparatus and, for this purpose, to exclusively assign the real processor cores to the virtual machines in accordance with a predetermined assignment scheme. The invention makes provision for the hypervisor apparatus to contain a hypervisor scheduler which provides, in addition to the assignment scheme, at least one further assignment scheme which provides, a further exclusive assignment of the real processor cores to the virtual machines, and for the hypervisor scheduler to be designed to switch between the assignment schemes on the basis of a demand signal.

10 Claims, 2 Drawing Sheets

(56) References Cited

U.S. PATENT DOCUMENTS

| | | | | |
|---|---|---|---|---|
| 2013/0155083 A1* | 6/2013 | McKenzie | .......... | G06F 9/45558 |
| | | | | 345/522 |
| 2016/0328254 A1* | 11/2016 | Ahmed | ............... | G06F 9/45545 |
| 2018/0088997 A1* | 3/2018 | Min | ...................... | G06F 11/301 |
| 2018/0293701 A1* | 10/2018 | Appu | .................... | G06F 9/5055 |

FOREIGN PATENT DOCUMENTS

| | | | |
|---|---|---|---|
| DE | 102012205301 A1 | 10/2013 | |
| DE | 102013007676 A1 | 11/2014 | |
| DE | 102013226700 A1 | 6/2015 | |
| WO | WO 2017/166207 A1 | 10/2017 | |

OTHER PUBLICATIONS

Arteaga, Dulcardo et al., "Cooperative Virtual Machine Scheduling on Mult-core Mult-threading Systems—A Feasability Study," School of Computing and Info. Sciences, Dep't. of Elec. and Comput. Eng'g, Fla. Int'l. Univ., MASDV Workshop 2010; 8 pages.

Quesnel, Flavian and Lebre, Adrien, "Cooperative Dynamic Scheduling of Virtual Machines in Distributed Systems," European Conf. on Parallel Processing, Euro-Par 2011: Parallel Processing, Conf. Paper 31917, 2011; pp. 457-466.

Anonymous, "Performance Best Practices for VMware vSphere 6.7," VMware, Inc., Palo Alto, CA, Jul. 27, 2018; 88 pages.

International Preliminary Report on Patentability directed to related International Patent Application No. PCT/EP2020/061587, completed Jun. 8, 2021, with attached English-language translation; 21 pages.

* cited by examiner

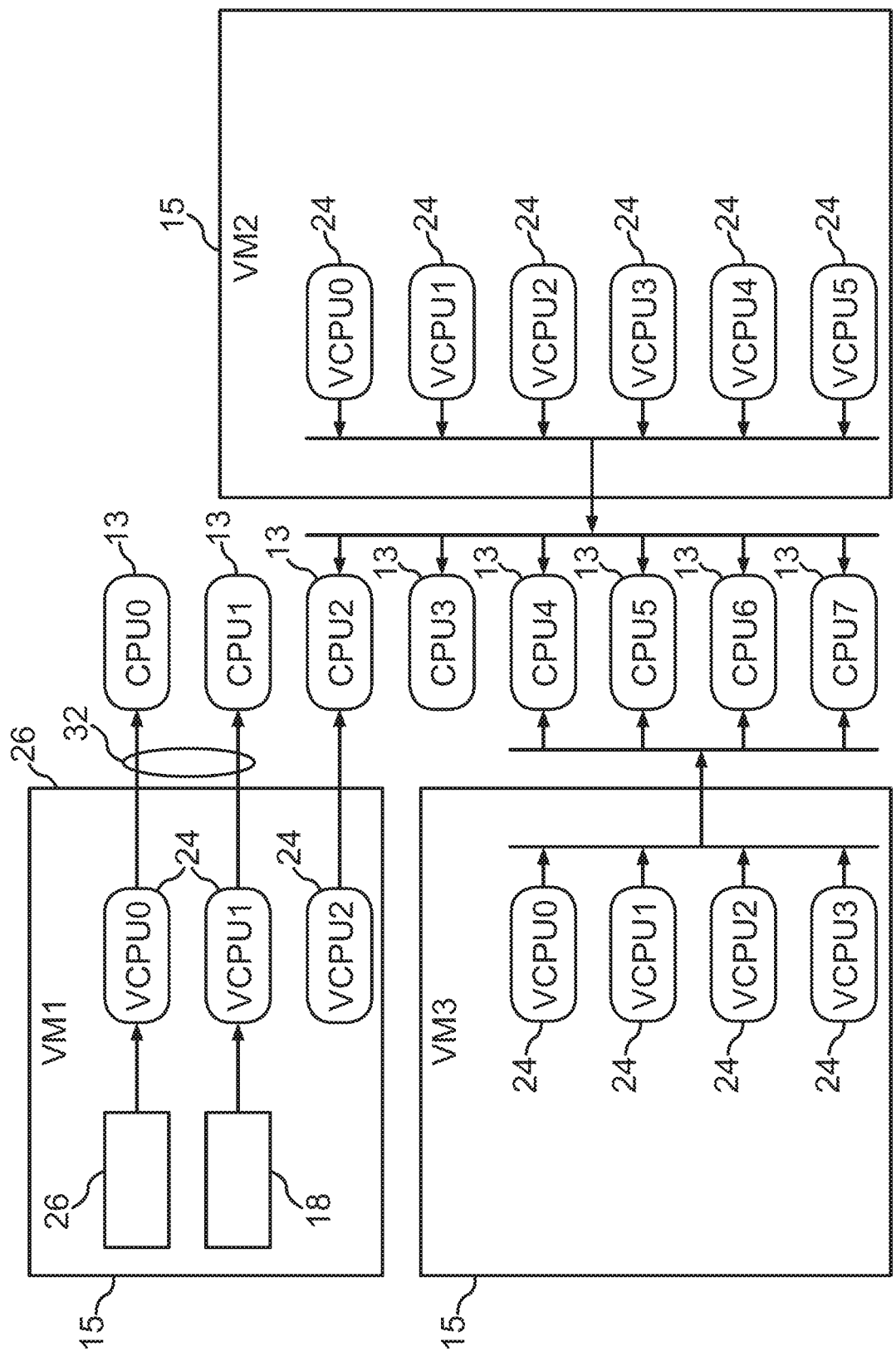

MOTOR VEHICLE COMPUTER SYSTEM WITH HYPERVISOR, AND MOTOR VEHICLE

TECHNICAL FIELD

The present disclosure relates to a computer system for a motor vehicle. The computer system can have a processor apparatus with a plurality of processor cores and a hypervisor apparatus. Using the hypervisor apparatus, a plurality of virtual machines can be run on the processor cores at the same time. The present disclosure also includes a motor vehicle with such a computer system.

BACKGROUND

In a motor vehicle, provision can be made for executing a plurality of software programs to operate a processor apparatus with a plurality of processor cores. Such a processor apparatus can be formed from a single processor chip (CPU—central processing unit) or a combination of a plurality of processor chips. In order to be able to run the software programs separately according to different categories, for example reliability in execution (safety) and/or protection against manipulability (security), provision can be made to operate virtual machines in which one or some of the software programs are then executed. A virtual machine represents a virtual computer, that is to say it is a software package in which can be contained at least one virtual processor core and an operating system that can be executed on the at least one virtual processor core.

The use of a computer system with virtual machines in a motor vehicle is known, for example, from DE 10 2013 007 676 A1. This describes the advantage that the virtual machines allow software programs to be encapsulated with respect to one another.

In order to be able to operate the plurality of virtual machines on the processor apparatus, it is known to provide a so-called hypervisor or a hypervisor apparatus. Such a hypervisor apparatus is designed to operate the virtual machines on the processor apparatus simultaneously and, for this purpose, to assign the real processor cores of the processor apparatus to the virtual machines in accordance with a predetermined assignment scheme. In other words, at least one real processor core is therefore permanently assigned to the processor apparatus for each virtual machine. This assignment is usually fixed, that is to say a real processor core of the processor apparatus remains assigned to exactly one virtual machine during the operation of the computer system.

This can lead to the disadvantage that, in the event that a software program executed there in a virtual machine requires a large amount of computing power for a certain period of time, this computing power can only be provided by the at least one real processor core of the processor apparatus, which is available due to the fixed assignment in the virtual machine anyway. Even if another virtual machine currently requires little computing power, i.e. the at least one processor core assigned to this virtual machine is only partially utilized, the remaining computing power cannot be used for a virtual machine with the high computing power requirement.

DE 10 2012 205 301 A1 describes a vehicle computer system with a hypervisor. Furthermore, it is described that the different virtual machines that are running simultaneously on the processor cores of the computer system can jointly access an input/output unit in that the hypervisor apparatus depicts or displays the input/output unit as a virtual input/output unit in each of the virtual machines. However, this does not result in an optimized distribution of the available computing power.

From DE 10 2013 226 700 A1 it is known that a hardware resource, such as access to a terminal, is exclusively and continuously assigned to only one virtual machine of a computer system of a motor vehicle and that data transmission between two virtual machines can be made possible by a hypervisor apparatus.

WO 2017/166207 A1 relates to the cooperative planning of virtual machines. One exemplary method includes managing a CPU mask by means of a virtual machine manager, the CPU mask comprising real-time availability for each of a plurality of physical CPUs. A virtual machine is allowed to read the CPU mask.

The publication by Arteaga et al with the title "Coperative virtual machine scheduling on multi-core multi-threading systems—A feasibility study" for the MASVDC Workshop 2010 concerns the cooperative scheduling of virtual machines, in particular to minimize processor loads.

The publication by Quesnel et al with the title "Cooperative dynamic scheduling of virtual machines in distributed systems" for Euro-Par 2011 also concerns the cooperative scheduling of virtual machines.

BRIEF DESCRIPTION OF DRAWINGS/FIGURES

FIG. 2 illustrates a schematic representation to illustrate different assignment schemes as they can be implemented by the computer system according to FIG. 1.

DETAILED DESCRIPTION

Figure 1:
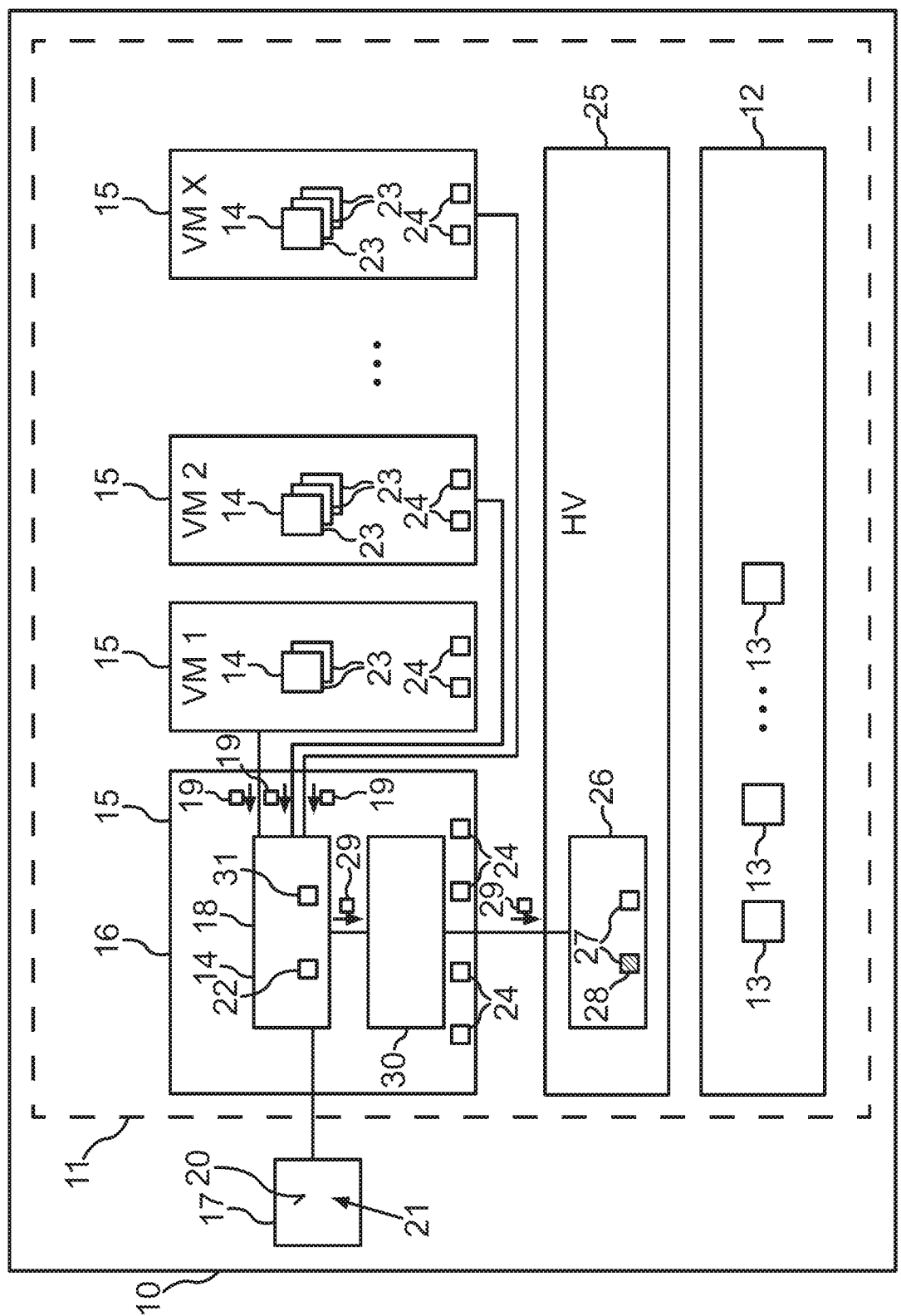
FIG. 1 illustrates a schematic representation of an embodiment of the vehicle according to the invention with an embodiment of the computer system according to the invention.

The object of embodiments of the the invention is distributing the available computing power of a plurality of processor cores to virtual machines of the computer system in a computer system of a motor vehicle.

The object is achieved by the subject matter of the independent claims. Advantageous embodiments of the invention are described by the dependent claims, the following description and the figures.

Embodiments of the invention provide a computer system for a motor vehicle. The computer system has a processor apparatus with a plurality of real processor cores. These processor cores are referred to here as real processor cores, which means that they are actually implemented in the form of circuits (as integrated circuits) and are not only available as software-based virtual processor cores. The processor apparatus can be based on a CPU or a cluster of a plurality of CPUs, wherein each CPU can have one or more of the processor cores.

In addition, a plurality of virtual machines is provided in the computer system, each virtual machine having at least one virtual processor core for executing software programs. In other words, particular software packages that can be operated or executed by means of the processor apparatus are provided in the computer system as virtual machines. Such an operated or executed virtual machine then provides a predetermined, fixed number of virtual processor cores within the virtual machine on which an operating system of the virtual machine is executed. Overall, it is provided here that a total number of virtual processor cores (all virtual machines taken together) is greater than a total number of real processor cores of the processor apparatus. In other words, it is therefore not possible to assign exactly one real processor core to each virtual processor core at a given instant.

A hypervisor apparatus (also called a hypervisor or virtualization layer) is provided for operating the virtual machines on the processor apparatus. The hypervisor apparatus is designed to operate the virtual machines on the processor apparatus simultaneously and, for this purpose, to exclusively assign the real processor cores to the virtual machines in accordance with a predetermined assignment scheme. "Exclusively" here means that a real processor core is only assigned to exactly one virtual machine at a given instant. In other words, virtual machines never share a processor core. As a result of the assignment, a computing power of the at least one virtual processor core is defined or determined in each virtual machine in that the at least one virtual processor core is implemented or operated by the at least one real processor core which is exclusively assigned to this virtual machine. It can therefore be provided, for example, that a virtual processor core of a virtual machine is supplied or implemented by a real processor core or that it depicts or reflects the computing power of the real processor core. Then the computing power of the virtual processor core is equal to the computing power of the real processor core. However, it can also be the case that only one virtual processor core is supplied with computing power any more or is implemented by a real processor core via a single real, shared processor core. Then the computing power per virtual processor core is less than the computing power of the real processor core. It can also be provided that two or more than two real processor cores are provided for a single virtual processor core, so that the virtual processor core then has more computing power than a single real processor core.

In order to be able to adapt the computing power of the virtual processor cores of the virtual machines, a hypervisor scheduler is provided according to the embodiment of the invention in the hypervisor apparatus. A scheduler comprises a circuit and/or software that can adapt the distribution of the real process cores to the virtual machines during operation depending on a need for computing power or generally depending on a scheduling rule. In connection with the hypervisor apparatus, a hypervisor scheduler is now provided by means of which, in addition to the said assignment scheme (assignment of the real processor cores to the virtual machines according to a predetermined configuration), at least one further assignment scheme is provided which provides for a different or further exclusive assignment of the real processor cores to the virtual machines. In other words, there are at least two different assignment schemes. Each assignment scheme defines which real processor core is assigned or used for which virtual machine to operate its virtual processor cores. The hypervisor scheduler is now designed to switch between the assignment schemes on the basis of a demand signal during the operation of the computer system. The demand signal therefore specifies which of the assignment schemes is currently to be set in the hypervisor apparatus. By setting or activating an assignment scheme, the assignment of the real processor cores to the virtual machines is then set accordingly as per the selected assignment scheme.

Thus, a hypervisor apparatus is created which not only makes provision for a static assignment or linking of real processor cores to virtual machines one time at the start, but the hypervisor apparatus can be switched during operation and for this purpose has the hypervisor scheduler, which switches between different assignment schemes on the basis of the demand signal. In addition, the required computing power of a virtual machine can be ensured depending on the situation.

Embodiments of the invention have the advantage that the computing power of the real processor cores can be distributed variably or dynamically among the plurality of virtual machines.

Embodiments of the invention also include further embodiments, which offer additional advantages.

In one embodiment, one of the virtual machines has a control interface for transmitting the demand signal from this virtual machine into the hypervisor apparatus. The control interface is designed to receive the demand signal from a software program executed on the virtual machine or on another of the virtual machine. In other words, a software program can therefore generate the demand signal and have this transmitted to the hypervisor apparatus via the control interface. Thus, the hypervisor apparatus can then receive the demand signal and activate the assignment scheme that is required or selected by the demand signal. The transfer to the hypervisor apparatus by means of the control interface can be transmitted, for example, on the basis of shared memory (a memory area of the main memory of the processor apparatus that is accessible or enabled for at least two program processes) and/or via a register (for example a processor register) and/or by means of an interrupt. The control interface has the advantage that the hypervisor scheduler can be controlled by a software program from a virtual machine with regard to the selection of the assignment scheme.

In one embodiment, one of the virtual machines is designed to operate a display device, for example a screen or a head-up display. For this purpose, the virtual machine has a display control program, i.e., a software program which is designed to set image content on a display device on the basis of graphic data. The image content can be pixel-based, for example, and the graphics data can define the pixel values (color and/or brightness) for the pixels of the image content. In order to generate the graphic data, application programs are provided in the virtual machines, that is to say the graphic data can be generated by more than one application program. The display control program can then combine or merge or overlay the graphic data of the different application programs, which can be executed according to a predetermined display scheme. The display control program is designed to determine a particular contributing portion or share of the application programs to/in the image content on the basis of a predetermined proportion calculation rule and to use the demand signal to distribute the computing power to the virtual machines according to the particular determined contributing portion by selecting a suitable assignment scheme using the demand signal. The display control program thus determines which application program contributes to what proportion of the generation of the image content, that is to say how great the computational effort of the particular application program is. The greater the contributing portion an application program has, the more computing power it needs. Correspondingly, an assignment scheme is then selected by means of the demand signal via which computing power is assigned to the virtual machine that operates or executes the particular application program in accordance with the contributing portion. Said display control program for controlling the display device can then also be, for example, said software program, which outputs the demand signal to the hypervisor apparatus via the control interface. Therefore, if the display control program has determined the demand signal, it transmits this to the hypervisor apparatus via the control interface.

Some embodiments dealt with the question of the form in which the share calculation for the contributing portion can be carried out. In one of these embodiments, the proportion calculation rule stipulates the particular contributing portion of a corresponding one of the application programs by means of a particular image area portion of the image content. The larger the image area portion of an application program in the image content, the greater, therefore, is the contributing portion. In addition or as an alternative to this, the corresponding contributing portion can be determined by a rate of change in the graphic data of the particular application program. The more frequent or the higher the repetition rate or change in area of the graphic data or the graphic portion of the application program per unit of time, the greater the contributing portion. For example, the contributing portion of an application program that displays a video and/or a graphic animation can therefore be assessed or evaluated as greater than an application program that displays a static graphic which does not change over time or a photo or image. In addition or as an alternative to this, an area contribution to the visibly displayed foreground of the image can be used as a basis for the contributing portion. The foreground of the image can be a predetermined sub-area of the display area of the display device. In addition or as an alternative to this, the remaining visible image content can be used as the image foreground, which results after the graphic data of the different application programs are overlaid. For example, it can be provided or it can happen that the graphics data of an application program are no longer displayed at all after all the graphics data have been overlaid, i.e. the application program is covered or overlaid by the graphics data of at least one other application program. In this case, there is no contributing portion for this application program. The measures described for determining the contributing portion have proven to be reliable indicators for the computing power currently required by the particular application program. The measures described can also be used in combination, for example by means of a weighted summation.

In one embodiment, the total number of assignment schemes from which a selection is made by means of the demand signal is less than 10. In particular, this total number is less than 7 or less than 6 or 5. In particular, only two or only three assignment schemes can be provided. This results in the advantage that the frequency or rate of change of the assignment schemes is correspondingly low, because the rasterization of possible assignment cases is correspondingly coarse due to the small total number of assignment schemes. This saves on loss of time in the operation of the hypervisor apparatus, as can be caused by switching that is too frequent. In particular, switching takes place less than, for example, once per minute.

In one embodiment, a static linking of each of the processor cores to one of the virtual machines is maintained during an activity of one of the assignment schemes. In other words, during the activity of the particular assignment scheme, provision is therefore made for each of the real processor cores for the particular virtual machine to be retained or linked throughout the entire assignment scheme. Of course, a change or context change between individual processes and/or threads of the virtual machine can then take place within the virtual machine. Nevertheless, the computing power of each real processor core assigned by the assignment scheme is retained in the virtual machine. This avoids fluctuations in performance within the virtual machines in relation to the computing power made available.

In one embodiment, all of the said assignment schemes have a common assignment part by means of which at least one of the virtual processor cores is assigned to one of the real processor cores. In other words, even if the assignment scheme is changed for this at least one virtual processor core, it is therefore ensured that a real processor core, in particular always the same real processor core, is assigned and/or remains assigned thereto. Thus, the computing power remains assigned for this virtual processor core even if the assignment scheme is changed. In this way, for example, a security-relevant software program (with regard to safety and/or security) can be ensured to be continuously supplied with a predetermined computing power regardless of the currently selected assignment scheme.

In one embodiment, the principle of the hypervisor is further extended by the computer system at least one graphics processor unit or GPU (graphical processing unit) and/or at least one hardware resource (for example a hardware acceleration unit for video decoding/video coding and/or an NPU (neural processing unit) being exclusively assigned by the hypervisor scheduler to one of the virtual machines according to the particular active assignment scheme, a GPU and/or another hardware resource also being made available exclusively for one virtual machine and in the process the assignment also being dynamically adapted or changed by changing the assignment scheme.

The computer system described is particularly advantageous for use in a motor vehicle.

Accordingly, embodiments of the invention also include a motor vehicle with an embodiment of the computer system according to the invention.

Embodiments of the invention are described below. In the drawings:

FIG. 1 is a schematic representation of an embodiment of the vehicle according to the invention with an embodiment of the computer system according to the invention;

FIG. 2 is a schematic representation to illustrate different assignment schemes as they can be implemented by the computer system according to FIG. 1.

The embodiments explained below are preferred embodiments of the invention. In the embodiments, the described components of the embodiments each represent individual features of the invention which are to be considered to be independent of one another and which each further develop embodiments of the invention independently of one another. Therefore, the disclosure shall also comprise combinations of the features of the embodiments other than the ones presented. Furthermore, the described embodiments may also be supplemented by further features of the invention as already described.

In the figures, the same reference signs refer to functionally identical elements.

FIG. 1 shows a motor vehicle 10, which may be an automobile, in particular a passenger car or truck. A computer system 11 can be provided in the motor vehicle 10, which can be configured, for example, as a central computer system or so-called head unit, in order to be able to provide computing power for a plurality of different uses or applications. The computer system 11 can also be provided independently of the motor vehicle 10.

The computer system 11 can have a processor apparatus 12, which can comprise a plurality of processor cores 13. The process cores 13 can be provided in a single CPU or in a cluster of a plurality of CPUs. In order to be able to provide different applications or functionalities, it can be provided that a plurality of different software programs 14 is provided in the computer system 11 and/or is executed during the operation of the computer system 11. In order to delimit the software programs 14 from one another in groups or to prevent mutual influencing of one another, a plurality of different virtual machines 15 (VM1 to VM X) can be provided which can be executed on the processor apparatus 12. One of the virtual machines 15 can represent an infrastructure controller 16 by means of which, in particular, a display device 17 or a plurality of display devices (not shown) can be controlled. For this purpose, a display control program 18 can be provided in the virtual machine 15 of the infrastructure controller 16 and can receive graphic data 19 from the software programs 14 by means of which an image content 20 can be defined on a display surface 21 of the display device 17.

Because graphics data 19 are present in a plurality of software programs 14, the display control program 18 can provide for a composition or compilation 22 of the graphics data 19 for generating the image content 20. The software programs 14 can, for example, each represent an application program 23 which, for example, can provide an operating menu for selecting and activating a plurality of vehicle functions and/or media playback (e.g. playing audio data and/or video data) and/or surfing the Internet and/or telephony functionality, to name just a few examples. A corresponding image output can be controlled by means of the graphic data 19 by the particular application program 23 via the display control program 18 on the display device 17. The display device 17 can comprise a particular screen, for example of a center console and/or an instrument cluster and/or as a head-up display unit (head-up display) and/or a front passenger screen and/or a rear seat screen and/or a door side screen.

In the virtual machines 15, the processor apparatus 12 with its processor cores 13 can be displayed or represented in a virtualized manner, in that virtual processor cores 24 can be provided or implemented for each virtual machine 15, which for the software programs 14 represent CPUs or processor cores on which the particular software program 14 is executed or can run. The number of virtual processor cores 24 can be fixed or unchangeable.

In order to obtain an association between the real processor cores 13 of the processor apparatus 12 and the virtual processor cores 24, a hypervisor or a hypervisor apparatus 25 (HV) can be provided in the computer system 11, for example on a hardware circuit (for example an integrated circuit or IC) and/or based on software.

In order to flexibly distribute the computing power available from the real processor cores 13 to the virtual processor cores 24, i.e. to allow dynamic adjustment of the assignment, the hypervisor apparatus 25 can have a scheduler for assigning the real processor cores 13 to the virtual processor cores 24, that is to say a hypervisor scheduler 26.

The hypervisor scheduler 26 can assign the real processor cores 13 to the virtual processor cores 24 on the basis of an assignment scheme 27, only one assignment scheme 27 being set as the active assignment scheme 28 at any instant. A conventional supervisor device 25 can only execute a single assignment scheme 27 when it is started, that is to say there is no hypervisor scheduler 26. By adding the hypervisor scheduler 26, the assignment scheme 27 can now be changed while the computer system 11 is in operation.

The change between the assignment schemes 27 can take place depending on a demand signal 29, which the hypervisor scheduler 26 can receive for the display control program 18, for example from one of the virtual machines, for example virtual machine 15. For this purpose, a control interface 30 can be provided in the virtual machine 15 for the display control program 18, which allows a software program, for example the display control program 18, to generate the demand signal 29 and provide it or transmit it via the control interface 30 to the hypervisor apparatus 25 and there in particular to the hypervisor scheduler 26.

For example, the display control program 18 can determine what computation requirement is currently required for the individual application programs 23 in order to generate the graphics data 19. For this purpose, the display control program 18 can, for example, execute or use a proportion calculation rule 31, which determines how large a particular contributing portion of the particular application program 23 to the image content 20 is. Correspondingly, an assignment scheme 27 can then be selected by means of the demand signal 29 which assigns more computing power of the real processor cores 13 to the particular virtual machine 15 on which the corresponding application program 23 is running or being executed, according to the contributing portion. The higher the contributing portion of an application program 23, the more computing power is therefore assigned to its virtual machine 15. The contributing portions of a plurality of application programs 23 of a virtual machine 15 add up accordingly to a total contributing portion per virtual machine 15.

FIG. 2 illustrates how a changing assignment of real processor cores 13 to virtual processor cores 24 of a plurality of different virtual machines 15 can be accomplished by means of a plurality of the assignment schemes. The virtual machines 15 are distinguished here by the designations VM1, VM2, VM3, which results in an exemplary total number of X=3. The virtual machine VM1 can, for example, manage the computer system 11 and, for this purpose have, for example, a software version of the hypervisor scheduler 26 and/or the display control program 18.

In order to ensure real-time capability and/or to provide ensured computing power, it can be provided for each of the possible assignment schemes 27 that an assignment part 32 common to all assignment schemes 27 is provided by which a particular real processor core 13 (for example CPU0 and CPU1) is always assigned to the virtual processor cores 24 of the virtual machine VM1 having the designations VCPU0 and VCPU1 (these are only given as examples).

For the further virtual processor core (VCPU2) of the virtual machine VM1 and the virtual processor cores 24 of the remaining virtual machines VM2 and VM3, a change of assignment between the real processor cores 13 and the virtual processor cores 24 can be provided on the basis of the active assignment scheme 27.

For example, six possible real processor cores 13 (CPU2 to CPU7) can be assigned to the six virtual processor cores 24 (VCPU0 to VCPU5) of the virtual machine VM2, wherein the number of assigned real CPU processor cores 13 can be different depending on the assignment scheme 27. Also for the four virtual processor cores 24 (VCPU0 to VCPU3) of the virtual machine VM3, one to four real processor cores 13 (in FIG. 2 the processor cores CPU4 to CPU7) can be assigned depending on the assignment scheme 27.

If a real processor core 13 is assigned to one or more virtual processor cores 24, arithmetic operations of the particular virtual processor core 24 are executed or implemented by the at least one assigned real processor core 13.

The particular software program of a virtual machine 15 only sees the virtual processor cores 24.

The constellation shown in FIG. 2 can provide the highest priority for the virtual machine VM1, that is to say a priority of the virtual machines VM2, VM3 is lower.

Each assignment scheme 27 can be designed in the manner known from the prior art. However, switching between a plurality of assignment schemes 27 by means of a hypervisor scheduler 26 is not known from the prior art.

The switchover can not only be provided for the described real processor cores, but an extension can be provided such that at least one GPU is provided via the assignment schemes 27 as a virtual GPU in each of the virtual machines 15, and a real GPU is assigned to one of the virtual GPUs by an assignment scheme 27. Additionally or alternatively, an assignment by an assignment scheme can also be provided for a further computing resource or another computing resource of the computer system 11 or, generally, a hardware resource, such as a hardware accelerator for video decoding and/or an NPU. These are then each represented as a virtual hardware resource in the virtual machines 15 in order to allow an assignment of a real hardware resource to the virtual resource by means of an assignment scheme and the hypervisor apparatus 25. Switching between different assignment schemes can be accomplished, for example, by stopping processing of program instructions on some or all of the real processor cores and assigning the virtual machines to the real processor cores in accordance with the new assignment scheme. Processing can then be restarted in the real processor cores.

Overall, the examples show how embodiments of the invention can provide a hypervisor scheduler 26 to schedule virtual machines 15 depending on a computation requirement for the calculation of an image content 20.

The invention claimed is:

1. A computer system for a motor vehicle, comprising:
   a processor apparatus comprising real processor cores implemented in circuitry;
   a plurality of virtual machines, each of which includes a predetermined, fixed number of virtual processor cores, wherein each of the plurality of virtual machines is configured to execute software programs, and wherein a total number of the virtual processor cores exceeds a total number of the real processor cores,
   wherein at least one of the plurality of virtual machines is configured to execute a display control program, the display control program configured to adjust an image content on a display device based on graphic data, the graphic data being generated by application programs running on the plurality of virtual machines, wherein the display control program is further configured to:
   determine an assignment scheme comprising respective contributing portions of the application programs to the image content; and
   use a demand signal to allocate processing power of the real processor cores across the plurality of virtual machines such that the processing power is assigned to each virtual machine of the plurality of virtual machines that executes the application programs in accordance with based on the respective contributing portions of the image content; and
   a hypervisor apparatus configured to run the plurality of virtual machines simultaneously on the processor apparatus, wherein the hypervisor apparatus is further configured to exclusively assign the real processor cores to the plurality of virtual machines in accordance with the assignment scheme, so that in each virtual machine a computing power of at least one virtual processor core is realized by at least one real processor core, wherein the at least one real processor core is exclusively assigned to a respective virtual machine,
   wherein the hypervisor apparatus is further configured to provide at least one further assignment scheme of a further exclusive assignment of the real processor cores to the plurality of virtual machines,
   and wherein the hypervisor apparatus including a hypervisor scheduler configured to switch between the assignment scheme and the at least one further assignment scheme based on the demand signal in an operation of the computer system,
   and wherein the hypervisor scheduler is implemented in the circuitry and/or a software, the hypervisor scheduler is further configured to adapt a distribution of the real processor cores to the plurality of virtual machines based on a demand for computing power.

2. The computer system according to claim 1, wherein one of the plurality of virtual machines has a control interface for transmitting the demand signal from the one of the plurality of virtual machines out into the hypervisor apparatus, wherein the control interface is designed to receive the demand signal from the application programs executed on the one of the plurality of virtual machines or another of the plurality of virtual machines.

3. The computer system according to claim 1, wherein the display control program is further configured to:
   set the image content on the display device on the basis of the graphic data, wherein the application programs are provided for generating the graphic data in the plurality of virtual machines; and
   determine the contributing portions of the application programs to the image content based on a predetermined proportion calculation rule.

4. The computer system according to claim 3, wherein the predetermined proportion calculation rule defines a particular contributing portion of a particular one of the application programs by one or more of:
   a particular portion of an image area in the image content,
   a rate of change of the graphic data of the particular one of the application programs, or
   a contribution to a visible foreground of the image area.

5. The computer system according to claim 1, wherein a total number of assignment schemes is less than 10.

6. The computer system according to claim 1, wherein a static linking of each of the real processor cores to one of the plurality of virtual machines is maintained during an activity of one of the assignment schemes.

7. The computer system according to claim 1, wherein all assignment schemes have a common assignment part by means of which at least one of the virtual processor cores is assigned to one of the real processor cores.

8. The computer system according to claim 1, wherein the computer system has at least one graphics processor unit (GPU), and/or at least one hardware resource that is exclusively assigned by the hypervisor scheduler to a particular active assignment scheme of one of the plurality of virtual machines, and wherein the at least one hardware resource represents a computer resource of the computer system and/or a hardware accelerator for a video coding and/or a neural processing unit.

9. The computer system according to claim 1, wherein the assignment scheme defines a real processor core assigned or used for operating a virtual processor core of a virtual machine of the plurality of virtual machines.

10. A motor vehicle comprising a computer system, wherein the computer system comprises:
- a processor apparatus comprising real processor cores implemented in circuitry;
- a plurality of virtual machines, each of which includes a predetermined, fixed number of virtual processor cores, wherein each of the plurality of virtual machines is configured to execute software programs, and wherein a total number of the virtual processor cores exceeds a total number of the real processor cores,
- wherein at least one of the plurality of virtual machines is configured to execute a display control program, the display control program configured to adjust an image content on a display device based on graphic data, the graphic data being generated by application programs running on the plurality of virtual machines, wherein the display control program is further configured to:
- determine an assignment scheme comprising respective contributing portions of the application programs to the image content; and
- use a demand signal to allocate processing power of the real processor cores across the plurality of virtual machines such that the processing power is assigned to each virtual machine of the plurality of virtual machines that executes the application programs in accordance with based on the respective contributing portions of the image content; and
- a hypervisor apparatus configured to run the plurality of virtual machines simultaneously on the processor apparatus, wherein the hypervisor apparatus is further configured to exclusively assign the real processor cores to the plurality of virtual machines in accordance with the assignment scheme, so that in each virtual machine a computing power of at least one virtual processor core is realized by at least one real processor core, wherein the at least one real processor core is exclusively assigned to a respective virtual machine,
- wherein the hypervisor apparatus is further configured to provide at least one further assignment scheme of a further exclusive assignment of the real processor cores to the plurality of virtual machines,
- and wherein the hypervisor apparatus including a hypervisor scheduler configured to switch between the assignment scheme and the at least one further assignment scheme based on the demand signal in an operation of the computer system,
- and wherein the hypervisor scheduler is implemented in the circuitry and/or a software, the hypervisor scheduler is further configured to adapt a distribution of the real processor cores to the plurality of virtual machines based on a demand for computing power.

* * * * *